US012314959B2

(12) United States Patent
Chafer et al.

(10) Patent No.: US 12,314,959 B2
(45) Date of Patent: May 27, 2025

(54) SECURE END-TO-END PAIRING OF SECURE ELEMENT TO MOBILE DEVICE

(71) Applicant: THALES DIS FRANCE SAS, Meudon (FR)

(72) Inventors: Sylvain Chafer, Suresnes (FR); Valentin Favreau, Issy les Moulineaux (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 18/014,786

(22) PCT Filed: Jun. 22, 2021

(86) PCT No.: PCT/EP2021/066960
§ 371 (c)(1),
(2) Date: Jan. 6, 2023

(87) PCT Pub. No.: WO2022/008231
PCT Pub. Date: Jan. 13, 2022

(65) Prior Publication Data
US 2024/0242227 A1      Jul. 18, 2024

(30) Foreign Application Priority Data

Jul. 8, 2020 (EP) .................................... 20315343

(51) Int. Cl.
*G06Q 20/00* (2012.01)
*G06F 3/16* (2006.01)
(Continued)

(52) U.S. Cl.
CPC .......... *G06Q 20/409* (2013.01); *G06F 3/167* (2013.01); *G06Q 20/341* (2013.01);
(Continued)

(58) Field of Classification Search
CPC .................................................... G06Q 20/409
(Continued)

(56) References Cited

U.S. PATENT DOCUMENTS 11,871,237 B1 *    1/2024   Han .................... H04W 92/10
2011/0028091 A1 *  2/2011   Higgins .............. H04L 63/0492
                                                           455/41.2
2014/0281547 A1    9/2014   Modzelewski et al.

OTHER PUBLICATIONS

Authors: Jian Meng et al; Title: Secure Mobile Payment Model Based on WAP; Publisher: IEEE; Date Added to IEEE Xplore: Nov. 18, 2008. (Year: 2008).*

(Continued)

*Primary Examiner* — Bruce I Ebersman
*Assistant Examiner* — Hatem M Ali (57) ABSTRACT

Establishing a secure link on a second protocol between a secure element and a smart device via a link on a first protocol by establishing a link on the first protocol between the secure element and the smart device, and generating, by the secure element, a communication encryption key and associating a status with the encryption key and assigning the status a first level. Transmitting the key and the status of the key from the secure element to the smart device over the link on the first protocol. The secure element and the smart device are paired over the second protocol thereby establishing a second-protocol link. Transmitting a message encrypted using the key to the smart device over the second-protocol link. Upon verifying the cardholder as an authorized cardholder for the secure element, elevating the status of the communication encryption key from the first level to a second level.

14 Claims, 7 Drawing Sheets

(51) Int. Cl.
  *G06Q 20/34* (2012.01)
  *G06Q 20/40* (2012.01)
  *H04W 12/041* (2021.01)
  *H04W 12/47* (2021.01)
  *H04W 12/50* (2021.01)

(52) U.S. Cl.
  CPC ......... *H04W 12/041* (2021.01); *H04W 12/47* (2021.01); *H04W 12/50* (2021.01)

(58) Field of Classification Search
  USPC .......................................................... 705/44
  See application file for complete search history.

(56) References Cited

OTHER PUBLICATIONS

2. Authors: Yatri Patel et al; Title: Securing Payment Transactions: A Comprehensive Review of Smart Cards and Contactless Payments with Cryptographic Methods; Publisher: IEEE; Date Added to IEEE Xplore: Apr. 18, 2024. (Year: 2024).*
International Search Report (PCT/ISA/210) and Written Opinion (PCT/ISA/237) mailed on Sep. 16, 2021, by the European Patent Office as the International Searching Authority for current International Application No. PCT/EP2021/066960—[12 pages].

* cited by examiner

SECURE END-TO-END PAIRING OF SECURE ELEMENT TO MOBILE DEVICE

FIELD

The present invention relates, generally, to secure elements and mobile devices, and, more particularly, to secure pairing of secure elements to mobile devices.

BACKGROUND

A secure element (SE) is a tamper-resistant electronic component that is typically used for storing host applications and the confidential and cryptographic data associated with those host applications. Herein, the term secure element is defined as an embedded integrated circuit that employs tamper resistant features to protect applications and data stored thereon.

Secure Elements are described in Introduction to Secure Elements, Global Platform, https://globalplatform.org/wp-content/uploads/2018/05/Introduction-to-Secure-Element-15May2018.pdf (2018).

While secure elements come in many different forms, one use of particular interest herein is their use in electronic payment cards and banking cards. An electronic payment and banking card may be used by a consumer to perform financial transactions, e.g., for the purchase of goods or services.

Thus, a secure element may host payment and financial services applications and associated credentials. The secure element provides services such as authentication, digital signature, and PIN management.

For the sake of brevity, hereinafter we use the term SE card to refer to a card, e.g., a payment or financial services card, that embeds a secure element.

While, secure elements are useful in payment and financial service cards, they are also found in many other devices, such as desktop boxes, vehicles, Internet of Things (IoT) devices, watches, etc.

Digital financial transactions are very convenient to users. However, there are security risks. It is therefore beneficial to add security features that avoid the risk of fraudulent use of payment and other financial services provided by an SE card. Of course, the secure element provides many security features, e.g., PIN verification. However, providing additional authentication factors enhances security associated with an SE card. An authentication factor based on PIN verification determines what the person carrying out the PIN verification knows. Do they know the PIN? A second authentication factor is based on what do they have.

Thus, it would be desirable for the SE element to confirm that the bearer of the SE card is in possession of another device linked to the SE card. Furthermore, it would be desirable for such device pairing to be secure and only to be made if authorized by the owner of the SE card. The document US2011/0028091A1 describes a method for near-field wireless device pairing in which a key is exchanged.

From the foregoing it is apparent that there is a need for an improved method to pair a secure element to a second device.

SUMMARY

A secure link is established on a second protocol, which may be Bluetooth Low Energy (BLE), between a secure element and a smart device via a link on a second protocol, which may be Near-Field Communication (NFC). The process includes establishing a link on the first protocol between the secure element and the smart device and in response thereto, generating, by the secure element, a communication encryption key and associating a status with the encryption key and assigning the status a first level, which in an embodiment is referred to as candidate status. Subsequently, transmitting a message encapsulating the encryption key and the status of the communication encryption key from the secure element to the smart device over the link on the first protocol. The secure element and the smart device pair over the second protocol thereby establishing a second-protocol link. The secure element transmits a message encrypted using the communication encryption key to the smart device over the second-protocol link.

In an aspect, response to detecting a pairing over the second protocol, determining, by the smart device, the status of the communication encryption key, providing to the cardholder on the smart device an informational message indicating the pairing of the secure element and the smart device as well as the status of the communication encryption key, for example, by displaying such a message on the smartphone or providing a voice message.

Pairing may be followed by authenticating a cardholder of the secure element and in response to verifying the cardholder as an authorized cardholder for the secure element, elevating the status of the communication encryption key from the first level to a second level, which in an embodiment is referred to as trusted.

In an aspect, in response to a transaction being performed using the secure element and a point of sales terminal, determining the status of the communication encryption key and if the status of the communication encryption key is the second level, transmitting transaction details to the smart device over the second-protocol link, otherwise, not transmitting any transaction details to the smart device; and in response to receiving, by the smart device, transaction details, displaying the transaction details for the cardholder on a display of the smart device.

In another aspect, in response to a transaction being performed using the secure element and a point of sales terminal, determining the status of the communication encryption key and from the status of the communication encryption key, transactions specifics, and security policy taking an action selected from proceeding with the transaction, preventing the transaction, requesting approval for the transaction from the cardholder by transmitting a request-for-approval message to the smart device.

In an aspect, a secure element and a smart device, respectively, include instructions directing a processor of these respective devices to carry out above described processes. These instructions may, advantageously, be stored in a program memory of the secure element and smart device, respectively.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The following description includes references to various methods executed by a processor of an integrated circuit chip. As is common in the field, there may be phrases herein that indicate these methods or method steps are performed by software instructions or software modules. As a person skilled in the art knows, such descriptions should be taken to mean that a processor, in fact, executes the methods, software instructions, and software modules.

The herein described technology provides for secure pairing of devices, in particular, the secure pairing of a secure element embedded in an SE card and a mobile device, for example, a smartphone.

Figure 1:
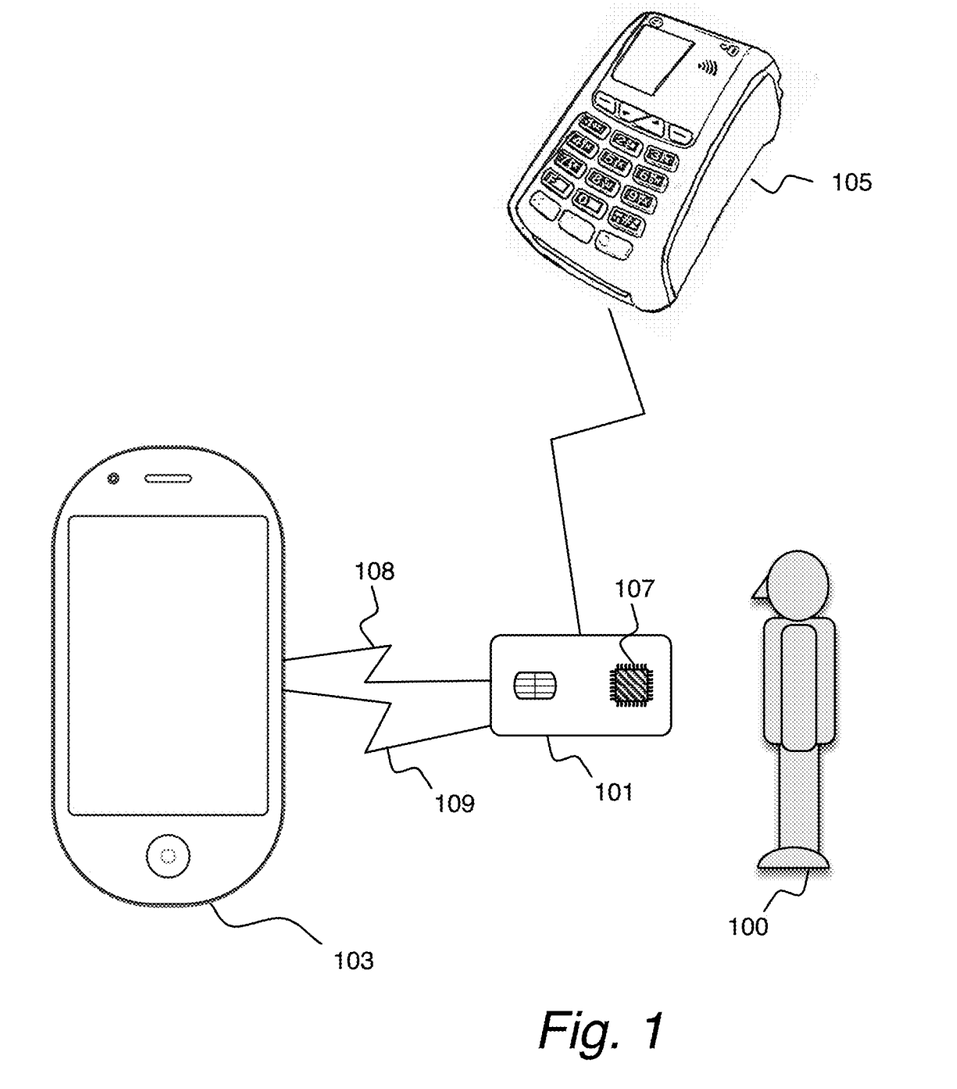
FIG. 1 is an illustration of a card having a secure element being used in conjunction with a smartphone by a cardholder to carry out a payment transaction via a point-of-sale (POS) terminal.

FIG. 1 is an illustration of an SE card 101 being used in conjunction with a smartphone 103 by a cardholder 100 to carry out a payment transaction via a point-of-sale (POS) terminal 105. The SE card 101 contains a secure element 107. The SE card 101 and the smartphone 103 belong to the same cardholder 100 and are used, as discussed in greater detail below, to secure transactions performed using the SE card 101 or to provide the cardholder 100 with information pertaining to the transactions performed.

A first short-range communication channel 108 may be established between the secure element 107 and the smartphone 103.

Subsequently, a second short-range communication channel 109 may be established between the secure element 107 and the smartphone 103. The second communication channel 109 provides many options for securing transactions carried out using the SE card 101. For example, the presence of the smartphone 103 may be required to carry out certain transactions. This eliminates fraudulent transactions carried out with a stolen SE card 101. If the card 101 has been stolen or found after being lost, if the corresponding smartphone 103 is not present within the range of the short-range communication channel 109, the second communication channel 109 cannot be established. Alternatively, the smartphone 103 may be used to provide transactional information to the user 100.

The first short-range communication channel 108 may be used to transmit a communication encryption key from the secure element 107 to the smartphone 103 such that communications between the secure element 107 and the smartphone 103 on the second short-range communication channel 109 may be encrypted.

In one embodiment, the SE card 101 is equipped to communicate with the smartphone 103 according to two communications protocols. In one embodiment, these are the near-field communications (NFC) protocol and Bluetooth® Low Energy (BLE) protocol. However, the technology described herein applies to any of a large number of communications protocols including WiFi and Zigbee.

A characteristic of NFC and BLE that make them attractive for the application discussed herein is that they operate over a very short distance. In the case of NFC, communications are limited to 4 cm and is activated by an "NFC tap" operation wherein a cardholder touches the communicating devices to one another. In the case of BLE, the theoretical maximum distance is about 100 meters; however, in practice much shorter distances (10-20 meters) can be expected. BLE is also very sensitive to physical barriers. Thus, a communications channel established between a secure element and a smartphone over BLE is assured of a close physical proximity of the two devices.

Figure 2:
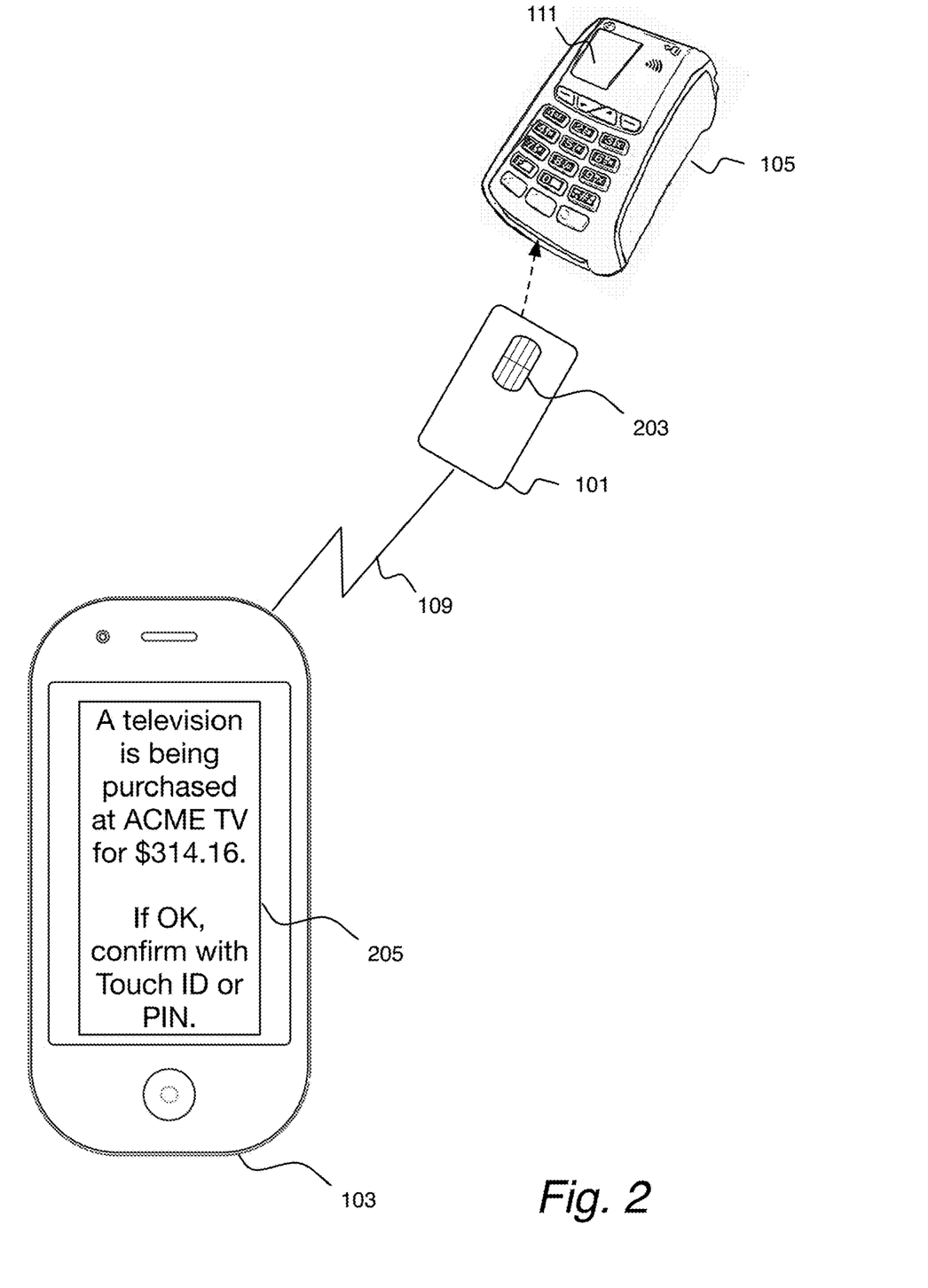
FIG. 2 is an illustration of the elements of FIG. 1 used in a payment transaction.

FIG. 2 is an illustration of the elements of FIG. 1 used in a payment transaction carried out using the SE card 101. The SE card 101 has been paired with the smartphone 103 for communication over a BLE communications channel 109.

To perform the transaction, the cardholder inserts the card 101 into the POS terminal 105 whereby the terminal and the secure element may communicate over contact pad 203, for example, using the contacted smartcard communications standard ISO 7816. The communication between the SE card 101 and the POS terminal 105 may be using other communications means, e.g., wireless communication under ISO standard 14443 or NFC.

In an embodiment, the BLE channel from the secure element 107 to the smartphone 103 is used for providing information to the cardholder. For example, when a transaction is about to take place an informational message is transmitted to the cardholder's smartphone 103 to allow the cardholder to know transaction details. The transaction details may also be saved on the smartphone 103 for record keeping.

In alternative embodiments, the smartphone 103 is used to provide additional security to ensure that transactions are as intended by the cardholder.

Transaction details may be communicated from the SE card 101 to the smartphone 103 over the BLE channel 109 and these transaction details may be displayed 205 for the cardholder to confirm. In other embodiments, the cardholder is informed in other ways by the smartphone 103. For example, the smartphone 103 may provide a voice message to the cardholder to inform the cardholder of the transaction details.

A transaction security protocol may allow for many different options that include or do not include the smartphone 103:

Allow all transactions and provide information on smartphone 103 over BLE link

Small transactions, e.g., smaller than 10.00 USD or 10.00 Euro, do not require a communication to the smartphone Medium sized transactions, e.g., between 10.00 (USD or Euros) and 100.00 (USD or Euro), require the SE card 101 to confirm that the smartphone is reachable, i.e., within the range of the used protocol Large sized transactions, e.g., over 100.00 (USD or Euro), the cardholder must confirm on the smartphone 103

Utilization of the smartphone 103 in conjunction with the smart element 101 during execution of financial transactions require pairing the two.

The communication between the smartphone 103 and the secure element 101 must be secure. Accordingly, the smartphone 103 and the secure element 101 engage in a pairing process described hereinbelow to establish a trusted communications encryption key for encrypting messages communicated between the two.

Figure 3:
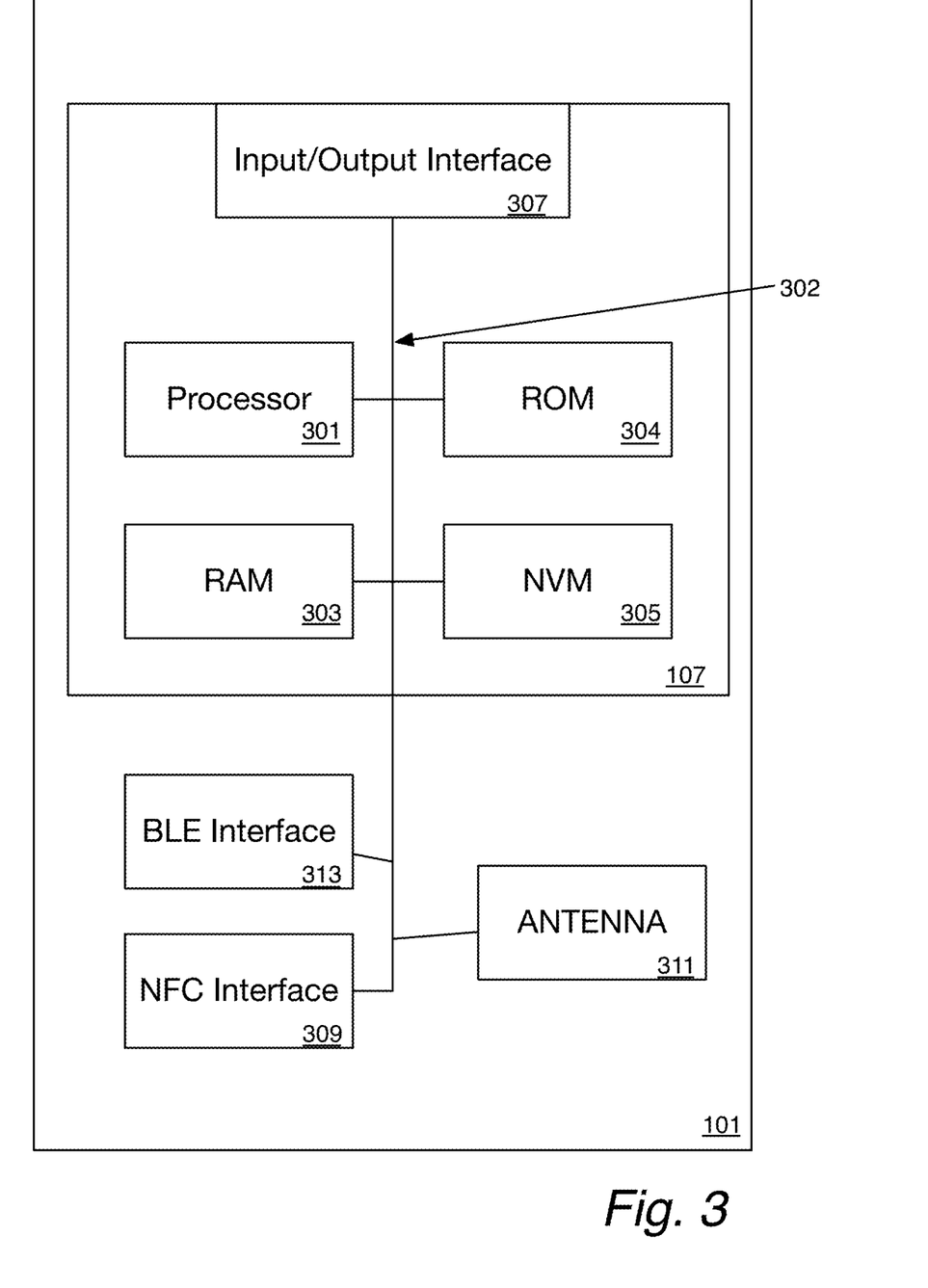
FIG. 3 is a high-level block diagram of a device architecture of a secure element card of FIGS. 1 and 2.

FIG. 3 is a high-level block diagram of a device architecture of an SE card 101 including a secure element 107. The secure element 107 may include a processor 301 connected via a bus 302 to a random-access memory (RAM) 303, a read-only memory (ROM) 304, and a non-volatile memory (NVM) 305. The secure element 107 further includes an input/output interface 307 for connecting the processor 301, again typically via the bus 302, to the contact pad 203 by which the secure element 107 may be connected to the POS terminal 105. Alternatively (or additionally) the SE card 103 contains an antenna 311 by which the SE device 103 may connect wirelessly to the POS terminal 105 via the input/output interface 307 over a wireless protocol, e.g., ISO 14443.

The SE card 103 further contains the communications interfaces 313 and 309 for communicating using the BLE communications protocol and the NFC communications protocol, respectively.

Figure 4:
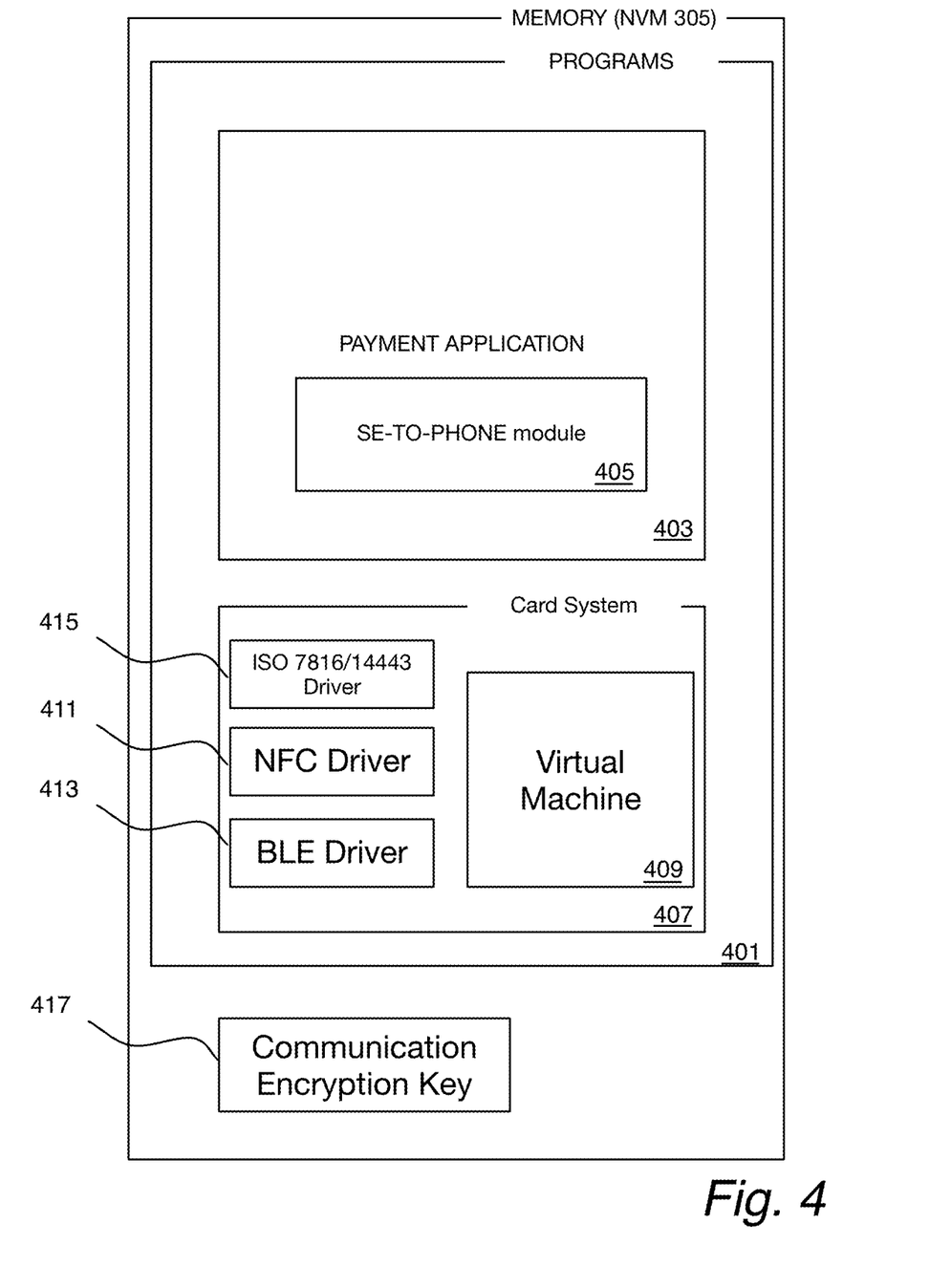
FIG. 4 is a block diagram programs and data stored in a memory of the secure element card of FIGS. 1 through 3.

The ROM 304 and/or NVM 305 may include a program memory 401 for storing programs executable by the processor 301, as is illustrated in FIG. 4. While it is depicted in FIG. 4 that the computer programs 401 are all co-located in the ROM 304 or the NVM 305, in actual practice there is no such restriction as programs may be spread out over multiple memories and even temporarily installed in RAM 303. Furthermore, the SE card 103 may include multiple ROMs or NVMs.

The program memory 401 include card system programs 407, which may include a virtual machine 409, as well as, a driver for NFC 411 and a driver for BLE 413, for communicating over the BLE and NFC interfaces 313 and 309, respectively. The card system 407 may also include a driver 415 for communicating over the ISO 7816 protocol.

The programs 401 also includes a payment application 403 through which a user 100 executes payments. The payment application 403 interacts with the merchant service provider over the POS terminal 105. The payment application 403 contains a module 405 for communicating with a paired smartphone 103. Thus, for example, when the payment application 403 attempts a purchase over the POS terminal 105, that triggers action of the smartphone 103, the SE-to-phone module sends appropriate messages to the phone over the BLE interface 313.

As discussed in greater detail below, the payment application 403 generates one or more communications encryption keys 417 and stores those keys in non-volatile memory 305.

Figure 5:
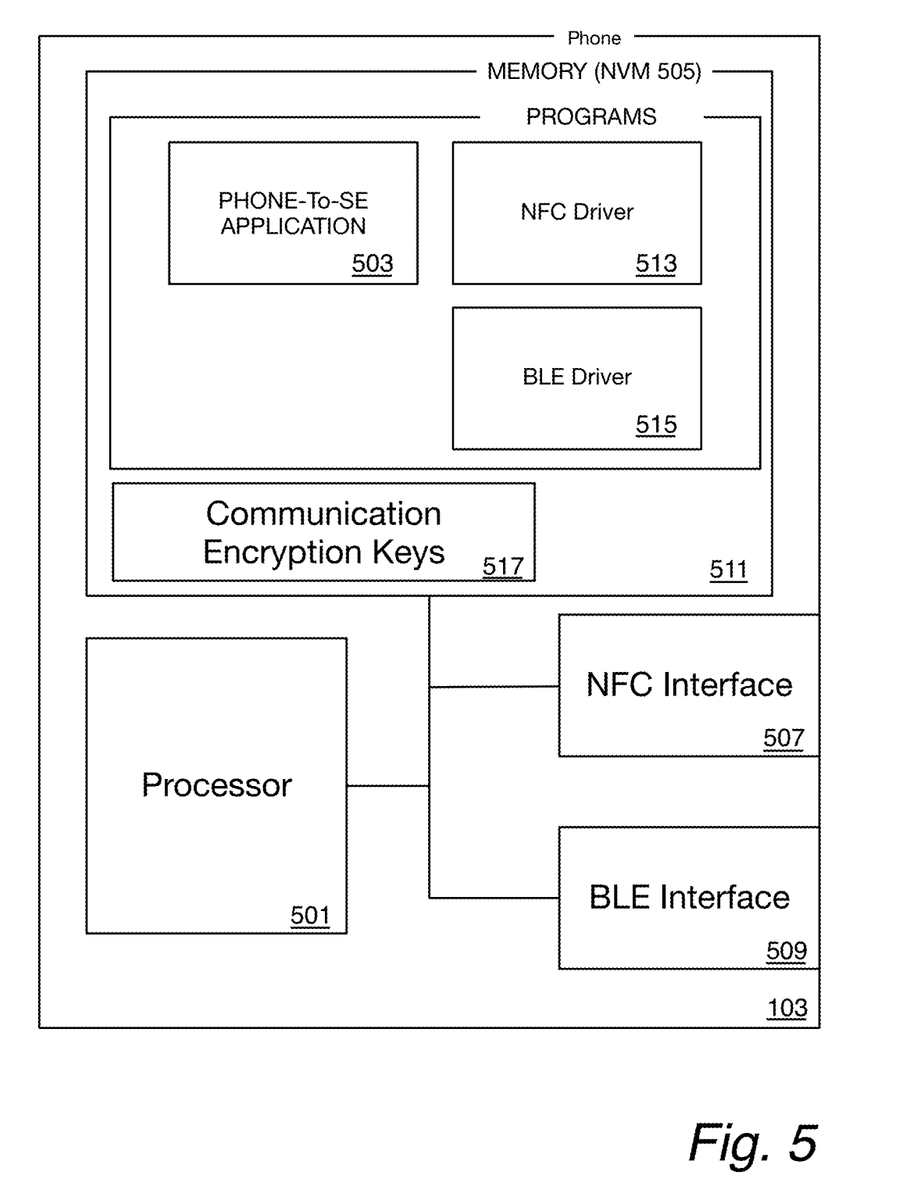
FIG. 5 is a high-level architecture diagram for the smartphone of FIGS. 1 and 2.

FIG. 5 is a high-level architecture diagram for the smartphone 103. The smartphone 103 contains a processor 501 and a memory 505 as well as NFC and BLE interfaces 507 and 509. The memory 505 contains programs 511, which include a phone-to-SE application 503 for communicating with the corresponding SE-to-phone application on the SE-to-phone module 405 of the payment application 403 of the secure element 107.

The program memory 511 also contains drivers 513 and 515 for communicating over the NFC and BLE protocols over the NFC and BLE interfaces 507 and 509, respectively.

The non-volatile memory 505 may also be used for storing the communication encryption key 517, which corresponds to the communication encryption key(s) stored on the SE card 101 (the communication encryption key 417).

Figure 6:
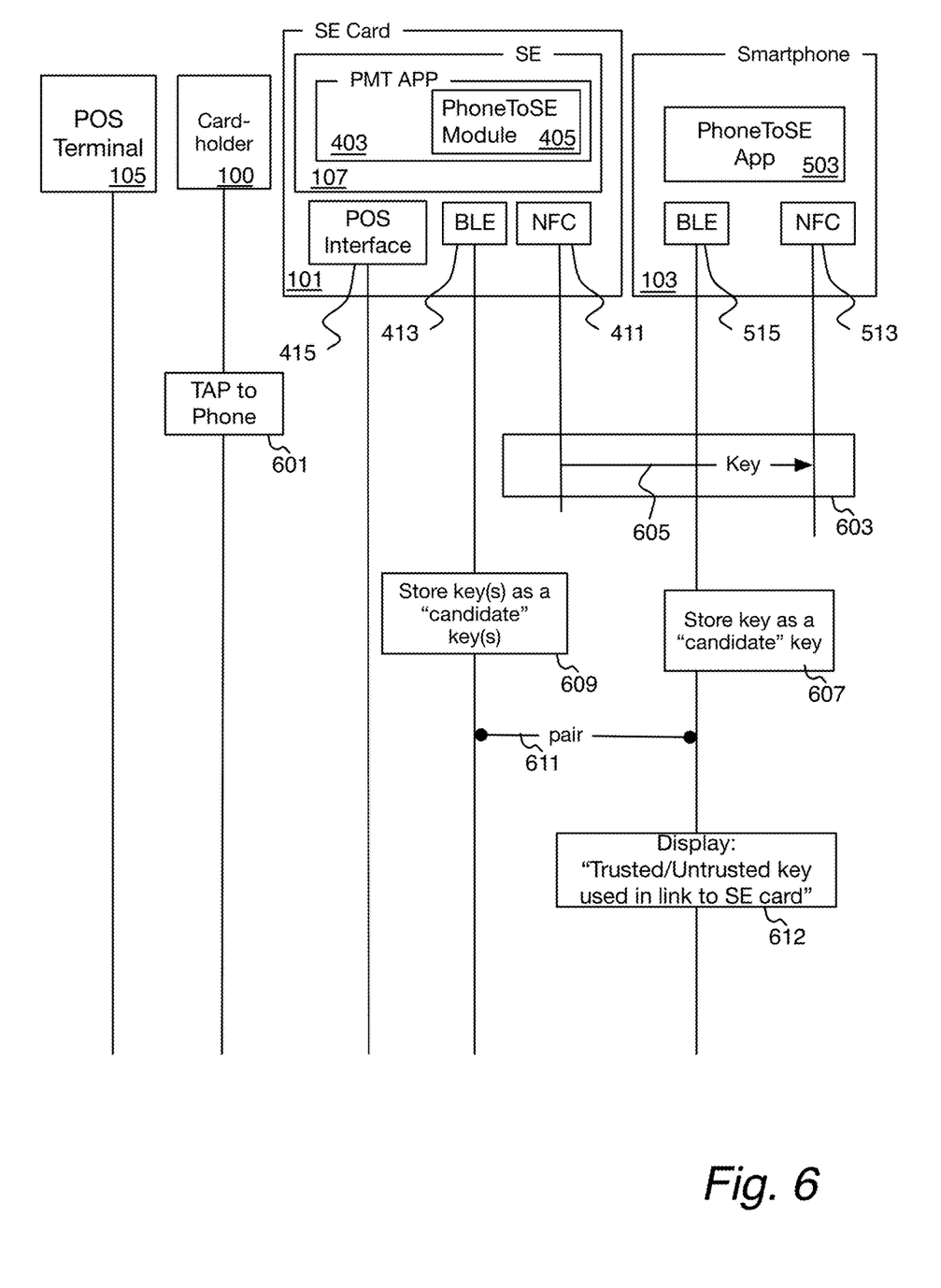
FIG. 6 is a timing sequence diagram illustrating secure provisioning of communication encryption keys over an NFC channel established between the payment application running on the secure element of FIGS. 1-4 and a corresponding PhoneToSE app running on the smartphone FIG. 5.

FIG. 6 is a timing sequence diagram illustrating secure provisioning of communication encryption keys 417/517 over an NFC channel established between the payment application 403 running on the secure element 107 on the SE card 101 and the corresponding Phone-To-SE app 503 running on the smartphone 103. The communication encryption key transferred over the NFC channel is used to secure a subsequent BLE communication when the smartphone 103 is paired with the secure element 107 to establish a BLE channel between the two by encrypting messages transmitted between the secure element 107 and the smartphone 103. Any of various encryption standards may be used, including, but not limited to, Advanced Encryption Standard (AES) and RSA as well as variations thereof. For ease of explanation, the description herein corresponds to symmetric encryption, e.g., AES. However, the technology also applies to asymmetric encryption, e.g., RSA.

The cardholder 100 "taps" SE card 101 on the smartphone 103, step 601. NFC operates in a range of less than 4 cm. Thus, a tap places the SE card 101 and smartphone 103 within this range. The tap establishes an NFC channel 603 from the secure element 107 to the smartphone 103. At the software layer, this channel allows communication between the payment app 403, which includes instructions for that purpose (here referred to as the SE-To-Phone module 405), and the corresponding application, the Phone-To-SE app 503 running on the smartphone 103.

The NFC channel 603 maybe a one-way channel from the secure element 107 to the smartphone 103 allowing the smartphone 103 to read NFC data exchange formatted (NDEF) tags. The NDEF tags encapsulate a communication encryption key, from the secure element 107.

The smartphone 103 reads the NDEF tag encapsulating a communication encryption key, step 605.

Each time the smartphone 103 reads an NDEF tag from the secure element 107, the secure element 107 provides a new communication encryption key. The communication encryption key may be generated from a master key stored in the secure element 107 or may be a random number.

The smartphone 103 stores the communication encryption key from the last tap operation as a candidate key in persistent memory, for example, the NVM 505, step 607. A candidate key is a communications encryption key that has been received by the smartphone 103 from the secure element 107 without the communications encryption key having been confirmed by validating the cardholder. Once the cardholder has been verified, the communications encryption key is promoted to be a trusted key.

In an embodiment, if the communications encryption key is merely a candidate key, the BLE link is only used to send information about the link itself, i.e., that a pairing has occurred between the secure element 107 and the smartphone 103 and that the communications encryption key 417/517 is a candidate key. In this embodiment, the Phone to SE Application 503 informs the cardholder that the communications encryption key 517 is a candidate key and to attain full functionality of the smartphone 103 in conjunction with the SE card 101, cardholder authentication must be performed.

In that embodiment, if the communications encryption key 517 has been promoted to be a trusted key, the BLE link may be used to send personal information such as transaction details that only a correct cardholder should be privy to.

The secure element 107 stores the last communication encryption key that it generates in response to the NFC tap event or may store a sequence of communication encryption keys if the SE card 101 (containing the secure element 107) is tapped multiple times against the smartphone 103, step 609. As the NFC link may be a one-way link from the secure element 107 to the smartphone 103, it cannot be known to the secure element 107 which key of the keys in the sequence of generated communication encryption keys is stored in the smartphone 103. Therefore, the secure element 107 sends encrypted messages corresponding to each candidate key that is stored on the secure element 107. If the smartphone 103 is able to decode one of those messages using the communication encryption key stored thereon and produce a correct response thereto, the secure element 107 can then infer from that response which communication encryption key in the stored sequence to use in communication with the smartphone 103. The most secure approach is to only store the last key. However, that may cause pairing on the BLE link to fail.

A communication encryption key that is a candidate key is used to secure the BLE link communication between the secure element 107 and the smartphone 103 by encrypting messages sent on the link using the key. However, until the cardholder has been validated, the communication encryption key that is a candidate key is not treated as trusted and the secure element 107 may limit what actions may be taken until the cardholder has been verified and the communication encryption key promoted to trusted.

Prior to verification of the cardholder 100, the communication encryption key 517 stored by the smartphone 103 and the communication encryption key(s) 417 stored by the secure element 107 are considered untrusted candidate keys.

Subsequently, the secure element 107 and the smartphone 103 are paired to create a BLE link between the two, step 611.

After each pairing, the smartphone 103 Phone-To-SE App 503 may check the status (candidate or trusted) of the communication encryption key 517 that the smartphone 103 has stored and display an information message on the phone, step 612. The message may state that the smartphone 103 has paired with an SE Card 101 and identify the card, e.g., "Your BNP Eurocard with account number ending 'XYZW' has been paired with this smartphone." The status of the communication encryption key may also be displayed. Before the cardholder has been verified, the status of the communication encryption key is as a candidate key. Thus, before verification the displayed message would be "An Untrusted key is used in the link to the card."

In one use case, the above steps may be performed in an off-line setting, e.g., at the cardholder's home or office. The later steps, which include verification of the cardholder, may be performed at a POS terminal located at a vendor location or offline using a card reader at the cardholder's location.

Figure 7:
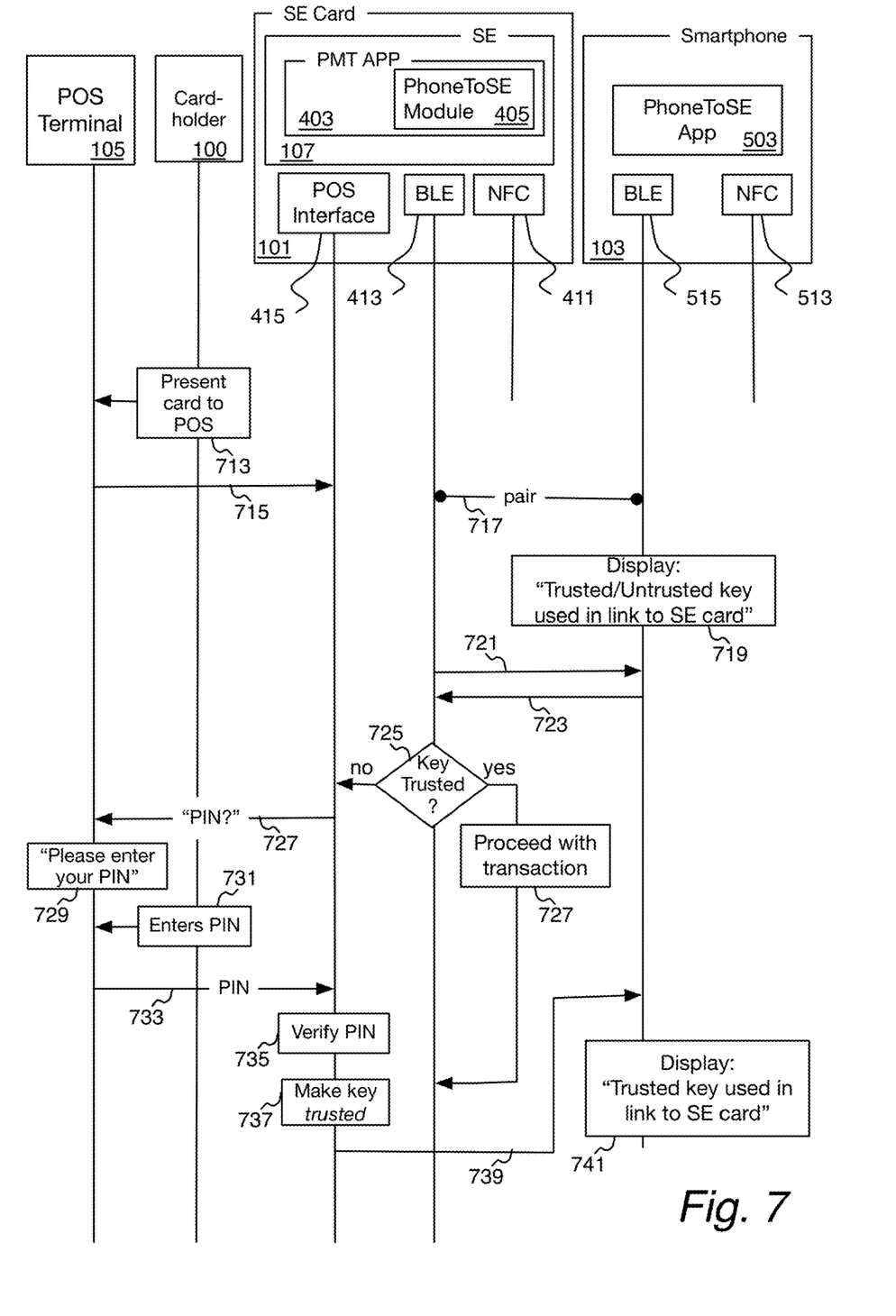
FIG. 7, which is a timing-sequence diagram illustrating the user-authentication of the cardholder and promotion of status of the communication encryption key from being a candidate key to becoming a trusted key.

There are many different usage patterns that may occur at this point. For example, the cardholder 100 may seek to make a purchase at a vendor site as illustrated in FIG. 7, which is a timing-sequence diagram illustrating the user-authentication of the cardholder and promotion of status of the communication encryption key from being a candidate key to becoming a trusted key. For example, the cardholder 100 presents the SE card inserts the SE card 101 into the POS terminal 105 to make a contacted connection or places the SE card 101 near the POS terminal 105 to make a contactless link to the POS terminal 105, step 713. Connected is used herein to refer to both contacted connection as well as contactless link between the SE card 101 and the POS terminal 105.

In response to having the SE card 101 presented to it, the POS terminal 105 creates a communication channel to the SE card 101, step 715. In an embodiment, this communication channel is a channel for transmitting APDUs as is described in ISO 7816. If there is no active BLE link, the SE card 101 attempts a new pairing operation, step 717 and, upon establishment of a link, new status messages would be displayed on the smartphone 103, step 719, including the status of the communication encryption key 517.

The SE card 101, in response to being connected to the POS terminal 103, sends one or more encrypted messages the smartphone 103 over the BLE link previously established, step 721. If the secure element 107 stores multiple candidate keys, the secure element 107 sends a message encrypted using each of those candidate keys. The messages may be a challenge-response test so as to confirm that the smartphone 103 has stored the correct communication encryption key thereby verifying the smartphone as the correct smart phone.

The smartphone 103 answers the message, step 723.

If the communication encryption key is trusted, step 725, the transaction proceeds and informational messages may be displayed on the smartphone 103 by the Phone-To-SE App 503.

If the communication encryption key is not trusted, step 725, the secure element 107 attempts to verify the cardholder 100, for example, by asking the cardholder to enter a PIN. Thus, the secure element 107 transmits a message on the POS interface 415 to the POS terminal to request the POS terminal 105 to obtain a PIN from the cardholder 100, step 727.

A message is displayed on a display of the POS terminal telling the cardholder 100 to enter their PIN, step 729. The user then enters the PIN, step 731, which the POS terminal 105 sends to the secure element 107, step 733.

The secure element 101 verifies the PIN, step 735, and if the PIN is verified, the secure element 101 changes the status of the communication encryption key 415 from candidate to trusted, step 737, and communicates the status change to the Phone-To-SE App 503 on the smartphone 103 over the BLE link, step 739. The smartphone 103 displays the status change of the communication encryption key 517 to the cardholder 100, step 741. After the key has been marked as trusted communications on the BLE channel are considered secure and the full functionality of the Phone-To-SE application 503 is made available, such as displaying personal messages to the cardholder.

While FIG. 7 depicts cardholder verification as being performed in conjunction with a payment transaction, in an alternative embodiment, the cardholder 100 verification is performed prior to presenting the SE card 101 to a POS terminal 105. For example, a cardholder with a card reader that is capable of communication under ISO 7816 or ISO 14443 may perform the cardholder verification procedure using that card reader at home or in the cardholder's office, for example.

Use Case: Unauthorized Repairing of a SE Card to a Second Smartphone.

Consider a scenario in which a legitimate pairing has been made between the secure element 107 and the smartphone 103. The legitimate cardholder 100 gives the SE card 101 to a merchant thereby giving temporary control of the SE card 101 to another person. If that person attempts to pair the SE card 101 to another smartphone 103', a message is transmitted over the BLE link from the SE card 101 to the original smartphone 103. The cardholder 100 may then reject the attempted pairing to the second smartphone 103'.

Use Case: Authorized Repairing of a SE Card to a Second Smartphone.

On the other hand, if the cardholder 100 obtains a new smartphone 103", the cardholder 100 is able to authorize the new pairing by repeating the sequence illustrated in and discussed in conjunction with FIG. 6.

In an alternative embodiment, the cardholder verification uses other mechanisms to verify the cardholder. Examples include biometrics such as fingerprint, iris scan, and voice print.

From the foregoing it will be apparent that an efficient and secure mechanism for pairing a smartphone to a secure element is provided.

Although specific embodiments of the invention have been described and illustrated, the invention is not to be limited to the specific forms or arrangements of parts so described and illustrated. The invention is limited only by the claims.

The invention claimed is:

1. A computer-implemented method for establishing a secure link on a second protocol between a secure element comprising a first hardware processor and a smart device via a link on a first protocol, said smart device comprising a second hardware processor and a first application configured to provide a plurality of functionalities in conjunction with the secure element, the method comprising:
   by way of the secure element and the smart device, establishing a link on the first protocol between the secure element and the smart device;
   in response to the establishment of a link on the first protocol, generating, by the secure element, a communication encryption key and associating a status with the communication encryption key and assigning the status a first level by initializing the status with a first value which indicates that the communication encryption key is a candidate key;
   transmitting a message encapsulating the communication encryption key and the status of the communication encryption key from the secure element to the smart device over the link on the first protocol;
   storing both the communication encryption key and the status in a memory of the smart device, said communication encryption key authorizing the first application to provide fewer than all functionalities of the plurality of functionalities being made available for the first application only if said first level is assigned to said status stored in the memory of the smart device,
   pairing the secure element and the smart device over the second protocol thereby establishing a second-protocol link;
   authenticating a cardholder of the secure element, said authenticating being performed by the secure element by checking a personal identification data provided by the cardholder through a physical device linked to the secure element;
   in response to the authenticating step verifying the cardholder as an authorized cardholder for the secure element, elevating the status of the communication encryption key from the first level to a second level by updating the status with a second value which indicates that the communication encryption key is a trusted key; all functionalities of the plurality of functionalities being made available for the first application only if said second level is assigned to said status stored in the memory of the smart device; and
   transmitting a message encrypted using the communication encryption key from the secure element to the smart device over the second-protocol link for communicating a change of the status to the second value,
wherein
   in response to a transaction being performed using the secure element and a point of sales terminal, determining the status of the communication encryption key and if the status of the communication encryption key is the second level, transmitting transaction details to the smart device over the second-protocol link, otherwise, not transmitting any transaction details to the smart device; and
   in response to receiving, by the smart device, the transaction details, informing the cardholder of the transaction details by the smart device providing the transaction details to the cardholder,
   wherein informing the cardholder of the transaction details comprises displaying the message with the transaction details on the smart device.

2. The computer-implemented method of claim 1 wherein the first protocol is near-field communication (NFC) and the establishing of the link on the first protocol is performed in response to an NFC tap operation.

3. The computer-implemented method of claim 1 wherein the second protocol is Bluetooth Low Energy.

4. The computer-implemented method of claim 1 further comprising:
   in response to detecting a pairing over the second protocol, determining, by the smart device, the status of the communication encryption key, informing the cardholder by the smart device providing an informational message indicating the pairing of the secure element and the smart device as well as the status of the communication encryption key.

5. The computer-implemented method of claim 4, wherein informing the cardholder of the pairing of the secure element and the smart device and status of the communication encryption key comprises displaying the informational message on the smartphone.

6. The computer-implemented method of claim 4, wherein informing the cardholder of the pairing of the secure element and the smart device and status of the communication encryption key comprises providing a voice message to the cardholder by smart device.

7. The computer-implemented method of claim 1 comprising the additional steps:
   generating by the secure element a plurality of encryption keys comprising said communication encryption key, and storing said plurality of encryption keys in a memory of the secure element;
   transmitting said plurality of encryption keys from the secure element to the smart device;

storing only the last received encryption key in the memory of the smart device; then sending by the secure element to the smart device a plurality of encrypted messages corresponding to each encryption key of the plurality of encryption keys;

getting, by the secure element, a correct response to one of said plurality of encrypted messages sent by the smart device;

inferring by the secure element from the correct response which encryption key is stored in the memory of the smart device; then using the encryption key stored in the memory of the smart device to secure communication between the secure element and the smart device.

8. The computer-implemented method of Claim 1, wherein informing the cardholder of the transaction details comprises providing a voice message to the cardholder by smart device.

9. The computer-implemented method of claim 1, further comprising:

in response to a transaction being performed using the secure element and a point of sales terminal, determining the status of the communication encryption key and from the status of the communication encryption key, transactions specifics, and security policy taking an action selected from proceeding with the transaction, preventing the transaction, requesting approval for the transaction from the cardholder by transmitting a request-for-approval message to the smart device.

10. A secure element having a first hardware processor and a program memory, the program memory storing instructions executable by the first hardware processor, including instructions to cause the processor to:

establish a first communication link to a smart device that comprises a second hardware processor and a first application (503) configured to provide a plurality of functionalities in conjunction with the secure element;

establish a second communication link to the smart device;

in response to the establishment of a link on the first protocol, generate a communication encryption key, associate a status with the communication encryption key and assign the status a first level by initializing the status with a first value which indicates that the communication encryption key is a candidate key;

transmit a message encapsulating the communication encryption key and the status of the communication encryption key on the first communication link to the smart device; said communication encryption key authorizing the first application to provide fewer than all functionalities of the plurality of functionalities only if said first level is assigned to said status, perform user authentication of a cardholder of the secure element by checking a personal identification data provided by the cardholder through a physical device linked to the secure element;

in response to a successful verification of the cardholder of the secure element, elevate the status of the communication encryption key from the first level to a second level by updating the status with a second value which indicates that the communication encryption key is a trusted key and transmit a message encrypted using the communication encryption key to the smart device over the second communication link for communicating to the smart device a change of the status to the second value; all functionalities of the plurality of functionalities being made available for the first application only if said second level is assigned to said status wherein in response to a transaction being performed using the secure element and a point of sales terminal, determining the status of the communication encryption key and if the status of the communication encryption key is the second level, transmitting transaction details to the smart device over the second-protocol link, otherwise, not transmitting any transaction details to the smart device; and in response to receiving, by the smart device, the transaction details, informing the cardholder of the transaction details by the smart device providing the transaction details to the cardholder, wherein informing the cardholder of the transaction details comprises displaying the message with the transaction details on the smart device.

11. The secure element of claim 10, wherein the instructions further include instructions to cause the first hardware processor to:

in response to detecting a pairing over the second protocol, determine the status of the communication encryption key, and transmit to the smart device an informational message indicating the status of the communication encryption key.

12. The secure element of claim 10, wherein the instructions further include instructions to cause the first hardware processor to:

in response to a transaction being performed using the secure element and a point of sales terminal, determine the status of the communication encryption key and if the status of the communication encryption key is the second level, transmit transaction details to the smart device over the second-protocol link, otherwise, not transmit any transaction details to the smart device.

13. The secure element of claim 10, wherein the instructions further include instructions to cause the first hardware processor to:

in response to a transaction being performed using the secure element and a point of sales terminal, determine the status of the communication encryption key and from the status of the communication encryption key, transactions specifics, and security policy taking an action selected from proceeding with the transaction, prevent the transaction, requesting approval for the transaction from the cardholder by transmitting a request-for-approval message to the smart device.

14. A system comprising the secure element of claim 10 and the smart device, wherein said smart device is a smartphone.

* * * * *